May 15, 1923.  
M. E. EXUM  
PORTABLE SERVING TABLE  
Filed Aug. 31, 1921  
1,455,395  
2 Sheets-Sheet 1

Inventor  
Mary E. Exum  
By E. W. Anderson  
Attorney

May 15, 1923.
M. E. EXUM
PORTABLE SERVING TABLE
Filed Aug. 31, 1921
1,455,395
2 Sheets-Sheet 2
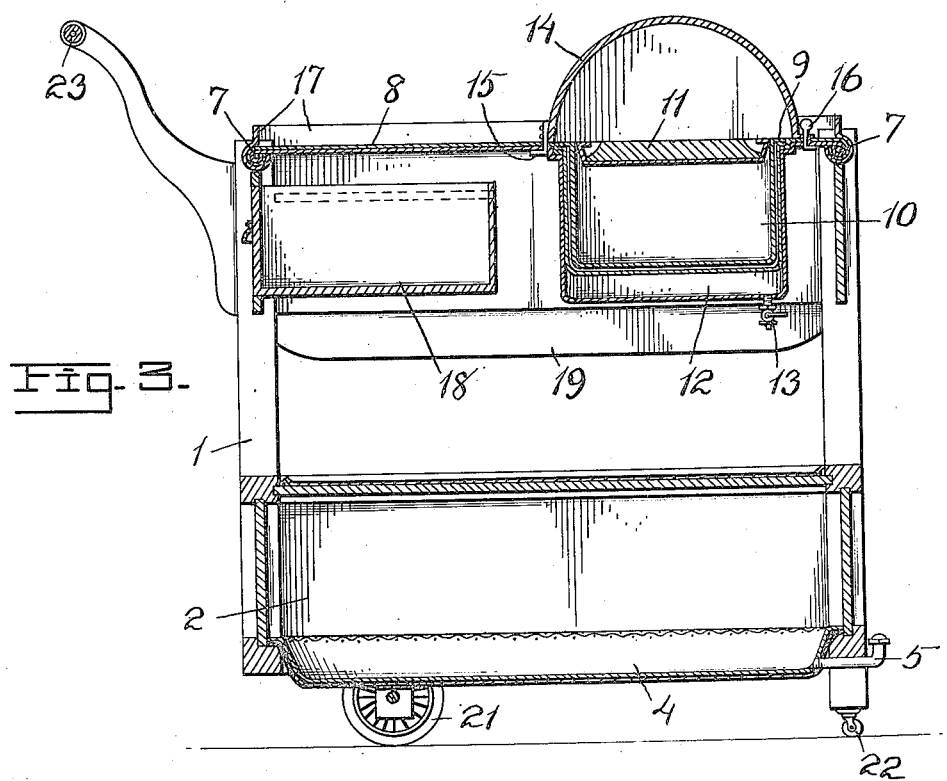
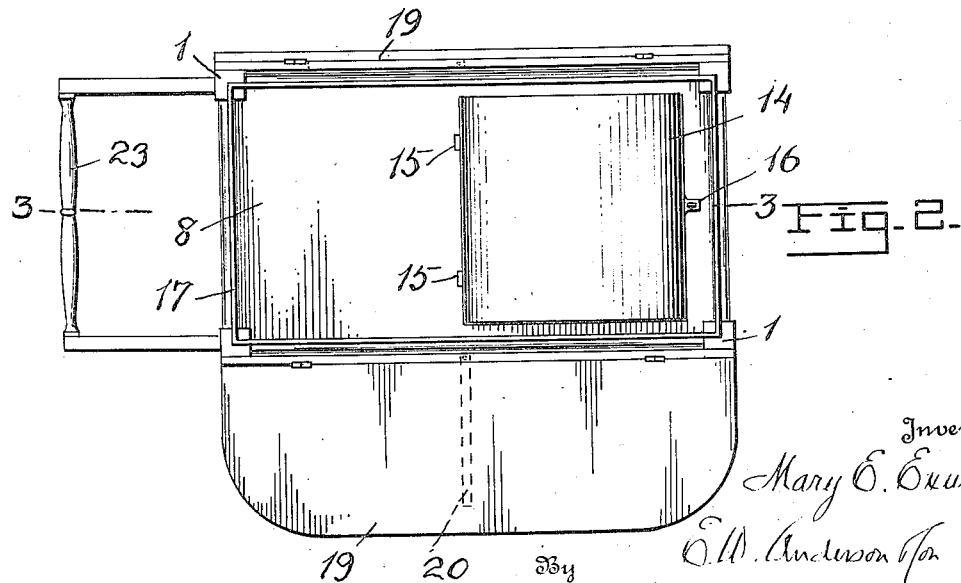
Inventor
Mary E. Exum.
E. M. Anderson
By
Attorneys Patented May 15, 1923.

1,455,395

UNITED STATES PATENT OFFICE.

MARY E. EXUM, OF WILSON, NORTH CAROLINA.

PORTABLE SERVING TABLE.

Application filed August 31, 1921. Serial No. 497,439.

*To all whom it may concern:*

Be it known that I, MARY E. EXUM, a citizen of the United States of America, and resident of Wilson, in the county of Wilson and State of North Carolina, have made a certain new and useful Invention in Portable Serving Tables; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 2 is a plan view of the same, with one leaf extended.

Figure 3 is a section taken on line 3—3, Figure 2.

Figure 1:
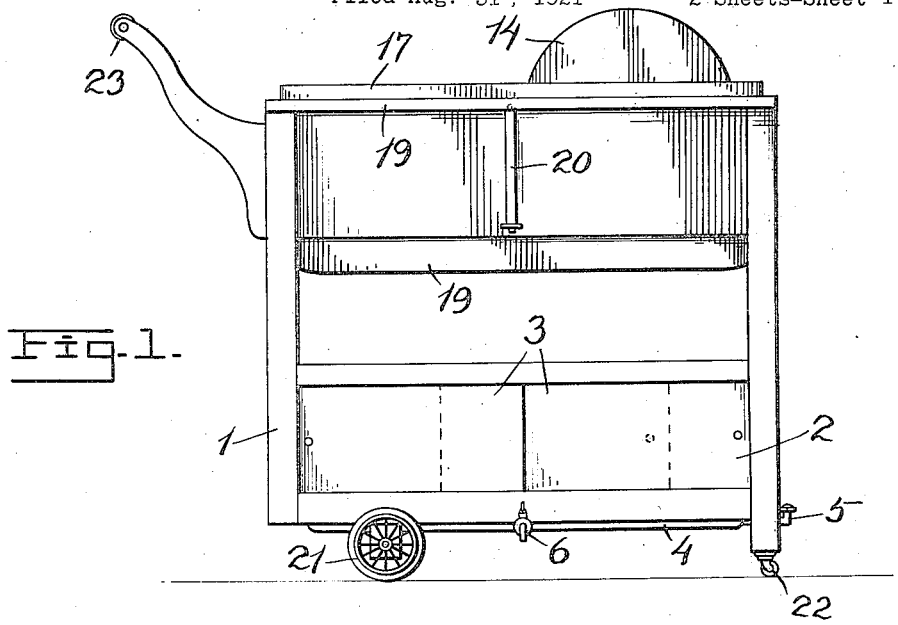
Figure 1 is a side view of the invention, one leaf being shown as extended.
Figure 4:
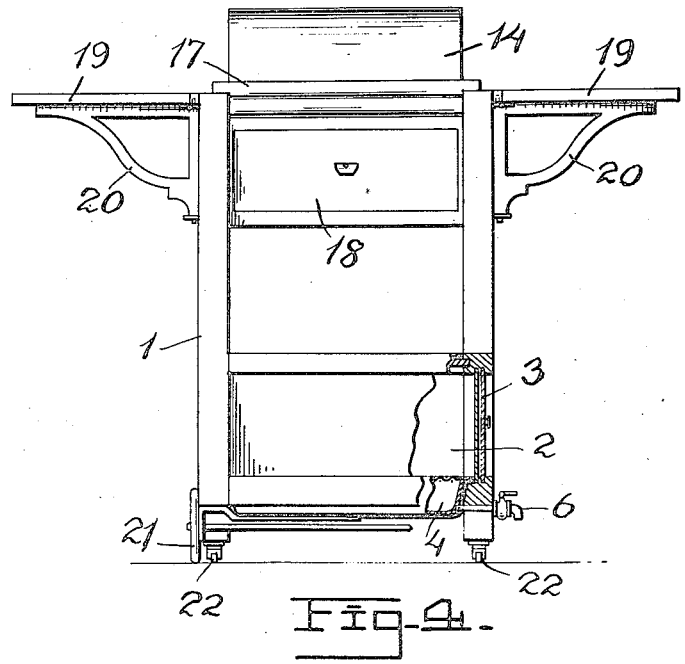
Figure 4 is an end view, with both leaves extended and parts broken away.

The invention has relation to portable serving tables for domestic, hospital or other use, having for its object the provision of means for transporting hot and cold foods or beverages from place to place, and for keeping them for considerable intervals of time at a constant temperature. It is also an object of the invention so completely to insulate the various compartments of the device that the maximum effect may be obtained from the heating and cooling media employed. A further object of the invention is to secure an arrangement of the parts whereby the provision of an ample insulating space may be consistent with a compact arrangement of the compartments, the hot and the cold dishes stored therein being almost equally near to hand.

The invention consists in the novel construction, combination and relation of parts, as hereinafter set forth.

In the accompanying drawings, illustrating the preferred embodiment of the invention, the numeral 1 designates the corner posts of a rectangular supporting frame to the lower portion of which are secured the walls of a heater compartment 2. Doors 3 close one side of this compartment, and below the level of the doors is secured a supporting rack of wire mesh or other openwork construction, overlying a pan 4 forming the bottom of the compartment. The pan 4 is made of a double thickness of metal, separated by insulating material, and is designed to be partially filled with hot water, through a suitable supply pipe 5, and may be drained by means of a valved pipe 6. The top of the compartment 2 is flat and preferably covered with a sheet of lead or other suitable material, flanged at the edges to form a tray upon which dishes may be placed.

Supported from the upper ends of the posts 1 by means of rods 7 is a tray or table top 8, having a cut away portion with the margin of which the upper flange 9 of an ice box 10 is designed to register. The ice box has a lid 11 lying preferably flush with the top 8, said box fitting within the walls of a receptacle 12, secured to the rods 7 and extending below the ice box to form a drip pan. A drain valve 13 is provided in the bottom of pan 12.

The lid 11 of the ice box is designed to form the bottom of a receptacle for foods or beverages which are to be kept cool, to which end a cover case 14 is provided, removably hinged at 15 and latched at 16 to the table top. This will insulate the articles placed upon lid 11 from the surrounding atmosphere, while the ice stored in box 10 will lower the temperature within the inclosure. Upon removal of the cover case 14 the surface of lid 11 becomes a part of the tray 8. The tray is completed by the provision of a marginal flange 17, shown as made of sheet metal, supported from the rods 7.

Beside the ice box 10, and occupying the remainder of the space immediately below the table top 8, is a drawer 18, in which silver, condiments or other articles may be carried.

The ice box and the other parts associated with the upper tray are spaced vertically from the lower tray and the heating compartment by a considerable interval, the only connection being made by the wooden posts 1, forming skeleton connections whereby said interval or space is open upon all sides to the outer air. Thus the heating and cooling compartments are effectually insulated; while the superposed arrangement provides for compactness and easiness of access.

To provide greater accommodation as a serving table, leaves 19 are hinged along each side of the tray 8, and may be supported in horizontal position by pivoted brackets 20.

The table is supported upon rear wheels 21 and forward casters 22, a handle being provided at 23 for convenience in propelling and guiding the device.

I claim:

1. A portable serving table, having an upper portion provided with an ice chamber and a lower portion having a heater chamber adapted to contain food dishes and spaced vertically from said ice chamber and having skeleton connections with said upper portion whereby the space between the heater and ice chambers is open upon all sides to the outer air.

2. A portable serving table, having an upper portion provided with an ice chamber and a lower portion having a heater chamber adapted to contain food dishes and spaced vertically from said ice chamber and having skeleton connections with said upper portion whereby the space between the heater and ice chambers is open upon all sides to the outer air, the top of the heater chamber forming the bottom of said vertical space and being adapted for receiving dishes, and the top of the ice chamber forming a part of the top of the serving table.

In testimony whereof I affix my signature in presence of two witnesses.

MISS M. E. EXUM.

Witnesses:
H. F. FLOWERS,
Mrs. W. P. DOAN.